US011645526B2

(12) United States Patent
Yu et al.

(10) Patent No.: US 11,645,526 B2
(45) Date of Patent: May 9, 2023

(54) LEARNING NEURO-SYMBOLIC MULTI-HOP REASONING RULES OVER TEXT

(71) Applicant: International Business Machines Corporation, Armonk, NY (US)

(72) Inventors: Mo Yu, White Plains, NY (US); Li Zhang, Yorktown Heights, NY (US); Tamir Klinger, Brooklyn, NY (US); Xiaoxiao Guo, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 16/911,645

(22) Filed: Jun. 25, 2020

(65) Prior Publication Data

US 2021/0406669 A1 Dec. 30, 2021

(51) Int. Cl.
*G06N 3/08* (2023.01)
*G06N 3/044* (2023.01)

(52) U.S. Cl.
CPC ............... *G06N 3/08* (2013.01); *G06N 3/044* (2023.01)

(58) Field of Classification Search
CPC ...... G06N 3/08; G06N 3/0445; G06N 3/0454; G06N 5/025
See application file for complete search history.

(56) References Cited

U.S. PATENT DOCUMENTS

| 9,720,907 | B2 | 8/2017 | Bangalore et al. |
| 11,176,323 | B2* | 11/2021 | Bull ........................ G06F 40/30 |
| 2019/0318249 | A1* | 10/2019 | Xu ......................... G06N 5/041 |

OTHER PUBLICATIONS

Jain, "Question Answering over Knowledge Base using Factual Memory Networks." Proceedings of the NAACL Student Research Workshop. 2016. pp. 109-115.
Kwiatkowski et al. "Scaling Semantic Parsers with On-the-fly Ontology Matching." Proceedings of the 2013 Conference on Empirical Methods in Natural Language Processing. 2013. pp. 1545-1556.
Lin et al, "Multi-Hop Knowledge Graph Reasoning with Reward Shaping." arXiv preprint arXiv:1808.10568v2. Sep. 11, 2018. 12 pages.
(Continued)

*Primary Examiner* — Khoi V Le
(74) *Attorney, Agent, or Firm* — Eric W. Chesley

(57) ABSTRACT

A method and a system for learning and applying neuro-symbolic multi-hop rules are provided. The method includes inputting training texts into a neural network as well as pre-defined entities. The training texts and the entities relate to a specific domain. The method also includes generating an entity graph made up of nodes and edges. The nodes represent the pre-defined entities, and the edges represent passages in the training texts with co-occurrence of the entities connected together by the edges. The method further includes determining a relation based on the passages for each of the pre-defined entities connected together by the edges, calculating a probability relating to the relation, generating a potential reasoning path between a head entity and a target entity. The method also includes learning a neuro-symbolic rule by converting the edges along the potential reasoning path into symbolic rules and combining those rules into the neuro-symbolic rule.

20 Claims, 7 Drawing Sheets

(56) References Cited

OTHER PUBLICATIONS

Zhang et al. "Variational Reasoning for Question Answering with Knowledge Graph." The Thirty-Second AAAI Conference on Artificial Intelligence. 2018. pp. 6069-6076.
Welbl et al., "Constructing Datasets for Multi-hop Reading Comprehension Across Documents." Transactions of the Association for Computational Linguistics 6 (2018): 287-302.
Xiong et al., "DeepPath: A Reinforcement Learning Method for Knowledge Graph Reasoning." arXiv:1707.06690v3, Jul. 7, 2018, 10 pages.
Das et al., "Go For a Walk and Arrive at the Answer: Reasoning Over Paths in Knowledge Bases Using Reinforcement Learning." arXiv:1711.05851v2, Dec. 30, 2018, 18 pages.
Riedel et al., "Relation Extraction with Matrix Factorization and Universal Schemas." Proceedings of NAACL-HLT 2013, pp. 74-84.
Toutanova et al., "Representing Text for Joint Embedding of Text and Knowledge Bases." Proceedings of the 2015 Conference on Empirical Methods in Natural Language Processing, Sep. 2015, pp. 1499-1509.
Wang et al., "ProPPR: Efficient First-Order Probabilistic Logic Programming for Structure Discovery, Parameter Learning, and Scalable Inference." Statistical Relations AI: Papers from the AAAI-14 Workshop, 2014, pp. 133-134.
Weber et al., "NLProlog: Reasoning with Weak Unification for Question Answering in Natural Language." arXiv:1906.06187v1, Jun. 14, 2019, 11 pages.
Dhingra et al., "Differentiable Reasoning over a Virtual Knowledge Base." Conference Paper at ICLR 2020, pp. 1-16.
Jiang et al., "Explore, Propose, and Assemble: An Interpretable Model for Multi-Hop Reading Comprehension." arXiv:1906.05210v1, Jun. 12, 2019, 12 pages.
Mell et al., "The NIST Definition of Cloud Computing", Recommendations of the National Institute of Standards and Technology, Special Publication 800-145, Sep. 2011, 7 pages.

* cited by examiner

LEARNING NEURO-SYMBOLIC MULTI-HOP REASONING RULES OVER TEXT

BACKGROUND

The present disclosure relates to machine reading comprehension, and more specifically, to learning neuro-symbolic multi-hop reasoning rules from texts.

Machine reading comprehension, or natural language understanding, is a subfield of natural language processing that tests the degree to which a machine can understand natural languages by asking the machine to answer questions based on a given text. Multi-hop reading comprehension refers to a methodology that seeks and combines evidence across multiple documents to extract knowledge. In other words, multi-hop reading comprehension attempts to extract knowledge from multiple texts beyond scenarios where relevant information is coherently and explicitly stated within a single passage.

Deep-learning techniques, such as neural networks, can be used in place of traditional rule-based and machine-learning-based reading comprehension techniques. Typically, neural machine reading comprehension systems take text and questions as inputs and outputs answers using four different modules. These modules include embeddings, feature extraction, context-question interaction, and answer prediction.

SUMMARY

Embodiments of the present disclosure include a computer-implemented method for learning neuro-symbolic multi-hop reasoning rules. The computer-implemented method includes inputting training data into a neural network. The training data includes texts and pre-defined entities relating to a specific domain. The computer-implemented method also includes generating an entity graph made up of nodes and edges. The nodes represent the pre-defined entities, and the edges represent passages in the training texts with co-occurrence of the entities connected together by the edges. The computer-implemented method further includes determining a relation based on the passages for each of the pre-defined entities connected together by the edges, calculating a probability relating to the relation, generating a potential reasoning path between a head entity and a target entity. The computer-implemented method also includes learning a neuro-symbolic rule by converting the edges along the potential reasoning path into symbolic rules and combining those rules into the neuro-symbolic rule.

Additional embodiments of the present disclosure include a computer-implemented method for applying neuro-symbolic multi-hop reasoning rules. The computer-implemented method includes inputting texts comprising passages pertaining to a context and a query relating to the context. The query includes a head entity and a target relationship. Optionally, a list of the correct answer and a list of answer candidates can also be inputted. The computer-implemented method also includes extracting entities from the texts. The entities relate to the head entity and the target relationship from the query. The computer-implemented method further includes generating an entity graph comprising nodes connected by edges. The nodes represent the entities extracted from the text, and the edges represent passages in the training texts with co-occurrence of the entities connected together by the edges. The computer-implemented method includes determining a symbolic relation for each of the edges in the entity graph, including a probability relating to the symbolic relation. The computer-implemented method also includes extracting potential reasoning paths for candidate answers in the entity graph. Candidate answers are answers relating to the head entity and the target relationship. The computer-implemented method includes scoring the potential reasoning paths based on a beam search to determine an optimal path as well as scoring based on structured prediction. The computer-implemented method also includes providing an answer based on the reasoning path with the highest rated score.

Further embodiments are directed to a neuro-symbolic rules learning system for generating neuro-symbolic multi-hop reasoning rules and configured to perform the methods described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
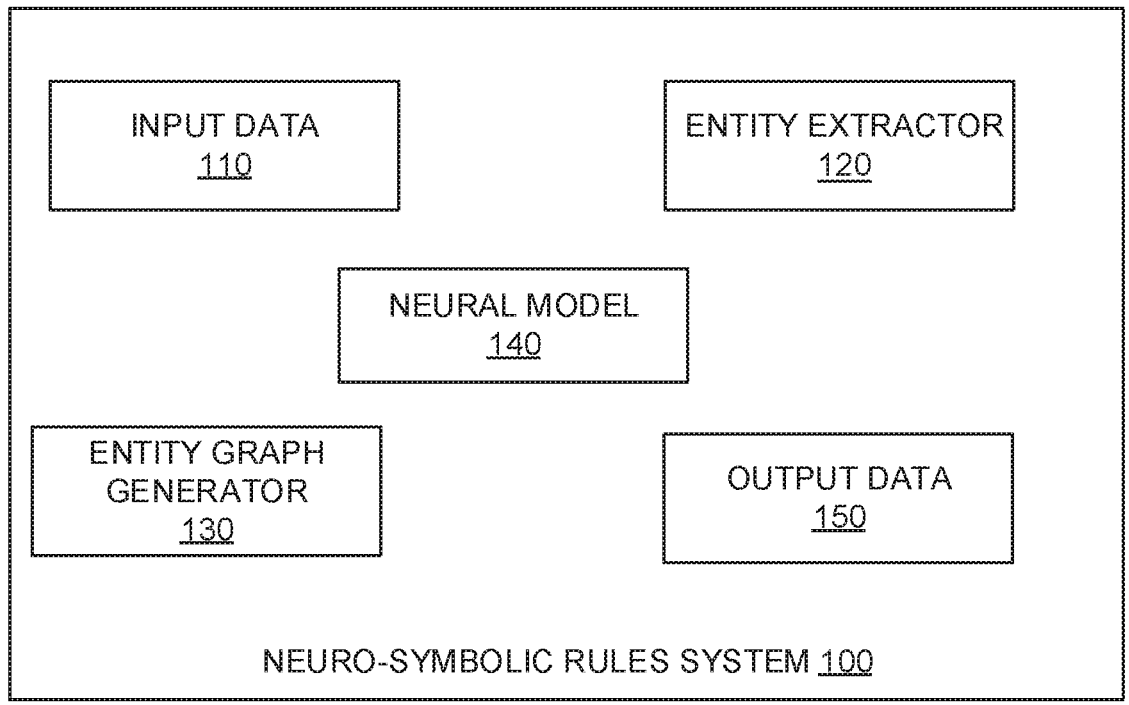
FIG. 1 is a block diagram illustrating a neuro-symbolic rules system, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to machine reading comprehension, and more specifically, to learning neuro-symbolic multi-hop reasoning rules from texts. While the present disclosure is not necessarily limited to such applications, various aspects of the disclosure may be appreciated through a discussion of various examples using this context.

Machine reading comprehension (MRC) is a task of textual question answering (QA), in which each question is provided context from which to infer an answer. The main objective is to extract a correct answer from the context or to generate an answer based on the context. In other words, given the context C and question Q, MRC tasks ask a model to provide an answer A to the question Q by learning the function F, such that A=F(C, Q). Methods for solving MRC tasks include rule-based methods and machine-learning-based methods. For example, a rule-based system may contain different heuristic rules with morphological analysis, such as part-of-speech tagging, semantic class tagging, and entity recognition. Machine-learning methods can combine bootstrapping, Markov logic, and unsupervised learning for machine-reading.

Advanced MRC systems extend MRC to allow for multi-hop, or multi-passage, MRC, which allows the MRC system to reason across multiple pieces of text and summarize the evidence. Multi-hop techniques allow an MRC system to develop inferences from multiple parts of a knowledge graph or text. Multi-hop reasoning over knowledge graphs (KG) allows machines to learn explicit inference formulas for a given KG. For example, if the KG includes the beliefs such as John Doe works for company A, and the company pays all employees a salary, then machines should be able to learn the following rule:

Michael Jordan played for the Chicago Bulls, and the Chicago Bulls are in the National Basketball Association, then machines should be able to learn the following rule:
empEarnsSalary(E, S)⇐empWorksForCompany(E, C)^CompanyPaysSalary(C, S)

After training, the machine should be able to use the formula, or rule, to automatically infer the missing link between a pair of entities.

Multi-hop reasoning over text allows machines to gather information from different parts of a text, or from different documents, to answer a question. One approach devises generic dataset derivations applied to two separate domains. Datasets are assembled by combining a document together with a corresponding knowledge base (KB) containing fact triples that are in subject-relation-object form. Bipartite graphs are formed by traversing the document using the KB triples.

Another approach to multi-hop reasoning over text relies on inputting a partially-populated KB and a set of relation mentions in context. The system learns how to extract new KB facts from the relation mentions and a set of logic rules that allow one to infer new KB facts. This method is set in a statistical relational learning (SRL) setting that also incorporates latent context into the SRL model. While in the SRL setting, scalable probabilistic first-order logic allows learning of relational rules that are mutually recursive, allowing the system to learn multi-hop inferences.

Limitations on multi-hop reasoning remain, however, as current implementations are mainly based on hand-crafted rules or features that require substantial human effort. Additionally, many systems do not provide predicate invention and are only compatible with KGs. Systems that do operate with KGs and texts do not use explicit multi-hop reasoning or rule-learning. Thus, those systems are incapable of generalization, and their performance may degrade. These traditional approaches ignore long-range dependencies but also fail to extract contextual information.

Embodiments of the present disclosure may overcome the above and other problems by using a neuro-symbolic rules system. The neuro-symbolic rules system provides a framework of learning neuro-symbolic multi-hop reasoning rules over texts. Texts pertaining to a particular domain are inputted into a neural network supporting entity-aware encoding. First, the neural network identifies entities in the texts and are taken as potential arguments. Structurally, for rules being learned, the left-hand-side is conveyed as a symbolic relationship and can be considered a target relation. The symbolic relationships can be either pre-defined symbols or induced from the texts. The right-hand-side of a rule can include conjunction of both symbolic relationships as well as textual rules that achieve the target relation. The neural model outputs textual rules from the inputted texts. Neuro-symbolic rules are learned by combining potential symbolic rules with neural textual rules generated by the neural model.

Once the rules are learned, the neuro-symbolic rules learning system can input a query with corresponding texts to determine an answer. Entities are identified within the text, and an entity graph is generated where the nodes of the entity graph are the entities, and the edges between the nodes are passages within the texts that contain the corresponding entities interacting with each other. The neural model applies the neuro-symbolic rules to the edges and additionally provides a probability for each rule. The probability corresponds to the confidence value the neural network has in that relation between the two entities. Potential reasoning paths are determined from the query head entity to a candidate answer where each reasoning path contains a probability of intermediate symbolic tuples from the texts. Once determined, the neuro-symbolic learning system traverses the paths to optimize each path to determine the optimal path. The reasoning path considered the optimal path is selected, and the candidate answer for that path is selected as the answer to provide.

Referring now to FIG. 1, shown is a block diagram illustrating a neuro-symbolic rules system 100, in accordance with embodiments of the present disclosure. The neuro-symbolic rules system 100 includes input data 110, an entity extractor 120, an entity graph generator 130, a neural model 140, and output data 150.

The input data 110 is data inputted during training or implementation of the neuro-symbolic rules system 100. The input data 110 includes training data, queries, a list of the correct answer, a list of answer candidates, a list of pre-defined entities, and a list of pre-defined relationships. The training data includes textual paragraphs pertaining to a particular domain. In some embodiments, the input data 110 is a dataset comprising tuples $<q, S_q, C_q, a>$ where q represents a query/question, $S_q$ represents a set of supporting texts, $C_q$ represents a set of candidate answer, and a represents the entity that correctly answers the question in the query q. In some embodiments, the input data 110 includes a KB containing triples $<s, r, o>$ where s is a subject entity, o represents an object entity, and r represents a unidirectional relation between the subject entity and the object entity.

In some embodiments, queries are represented as tuples. The tuple can be represented as $<s, r, ?>$ where the object entity is unknown, and it has to be inferred from the readings of the texts. To answer the query, the neuro-symbolic rules system 100 can find the entity that is the object of the tuple in the texts that match the subject entity and relation. If the candidate answers are provided, then the object entity answer is selected from the candidates.

The entity extractor 120 is a component of the neuro-symbolic rules system 100 configured to extract entities from texts, in accordance with embodiments of the present disclosure. In some embodiments, entities are extracted via string matching. For example, if a pre-defined list of arguments is included, then the entity extractor 120 pairs those arguments with entities located within the text.

In some embodiments, a Long Short Term Memory (LSTM) model is used to extract the entities in the texts. LSTM models are capable of capture long-distance dependencies of context and avoid gradient varnishing when extracting entities. An LSTM model can include three layers: the input layer, the LSTM layer, and the inference layer. The input layer generates a representation of each word of a sentence. The LSTM layer outputs another word representation sequence that captures the context information of each word in the sentence. The inference layer makes tagging decisions according to the output of the LSTM layer. The input layer can generate a representation of each word of a sentence using a dictionary lookup, which includes two parts: token-level representation and character-level representation. The LSTM layer takes the word representation sequence of the sentence as input and returns another sequence that represents context information of the input at every position. The inference layer makes tagging decisions according to the output of the LSTM layer.

Regarding the input layer, the representation of a word can be generated from a token-level and a character-level that capture context information and morphological information of the word, respectively. The token-level representation can be pre-trained by a neural language model (e.g., continuous bag of words (CBOW), skip-gram) on a large unlabeled dataset. The character-level representation can use a bidirectional LSTM that can capture both past and future context of words, or on a CNN to model the character sequence of words. In a bidirectional LSTM, the last two output vector of the forward and backward LSTMs are concatenated into the character-level representation of the word. In the CNN, the sequence of character embeddings is convoluted with filters and further pooled to generate a character-level representation of the word.

Regarding the LSTM layer, a bidirectional LSTM can be used to generate context representation in every position. Given a sentence, with each word, the bidirectional LSTM takes a sequence of word representations as input and produces a sequence of context representations. Regarding the inference layer, a conditional random field can be employed to predict an entity from a sequence of context representations.

The entity graph generator 130 is a component of the neuro-symbolic rules system 100 configured to generate entity graphs that are used to relate mentions to entities within and across texts, in accordance with embodiments of the present disclosure. Entity graphs include nodes with edges connecting node pairs. Each node represents an entity extracted from the entity extractor 120, and the edges represent the passages of co-occurrence between the corresponding node pairs. In some embodiments, the entity graph is assembled by connecting text mentions of candidate answers within and across the inputted texts.

The neural model 140 is a component of the neural-symbolic rules system configured to generate neural-symbolic rules, in accordance with embodiments of the present disclosure. The neural model 140 can include embedding, feature extraction, context-query interaction, and answer prediction modules. The embedding module is configured to encode input natural language words into fixed-length vectors, which the neural model 140 can understand. The embedding module can employ several types of embedding methods. These methods include, for example, conventional, contextual, and multiple granularity methods. Conventional methods include, for example, One-Hot and distributed. Contextual methods include, for example, Contextual Word Vectors (CoVE), Embeddings from language models (ELMo), generative pre-training (GPT), and bidirectional encoder representation from Transformers (BERT). Multiple granularity methods include, for example, character embeddings, part-of-speech tags, name-entity tags, binary feature of exact match (EM), and query-category.

The feature extraction module is configured to extract features of the context and question separately. Additionally, the feature extraction module can mine for contextual information at the sentence-level based on various types of syntactic and linguistic information encoded by the embedding module. Recurrent neural networks (RNNs), convolutional neural networks (CNNs), and transform architecture can be applied by the feature extraction module.

The context-question interaction module is configured to find evidence for answer prediction within the texts. The context-question interaction module can implement an attention mechanism to encode sequence data. The attention mechanism can be categorized into unidirectional and bidirectional attention according to whether it is used unidirectionally or bidirectionally. Unidirectional attention flow highlights the most relevant parts of the context according to the question asked in the query. If a context word is similar to the question, then it has a higher likelihood of being the answer. The similarity of each context semantic embedding, and the whole question sentence representations, is calculated by a softmax function. Additionally, an attention weight for each context word can be obtained that can be used to predict the answer.

The answer prediction module provides answers to questions provided in a query. The answer prediction module can apply learned rules to each path between a query entity and an answer candidate within an entity graph. Additionally, a structured prediction is supported among relations in each rule. The structure can be defined by symbolic rules.

Figure 2A:
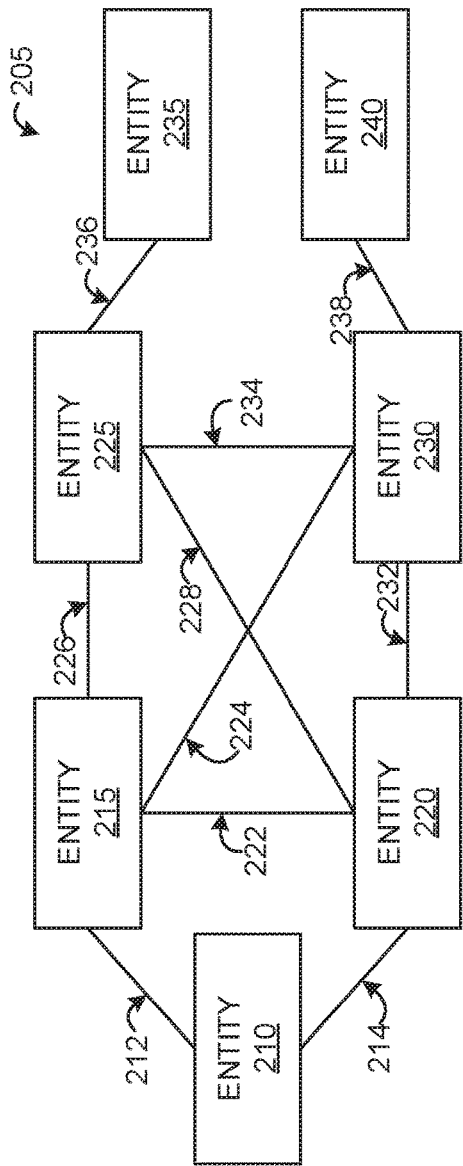
FIGS. 2A and 2B are entity graphs generated by the neuro-symbolic rules system, in accordance with embodiments of the present disclosure.

FIG. 2A is an entity graph 205 generated by the neuro-symbolic rules system 100 prior to applying learned rules, in accordance with embodiments of the present disclosure. The entity graph 205 includes entity nodes 210, 215, 220, 220, 225, 230, 235, and 240. Each entity node is an entity extracted from the texts that are relevant to a predetermined domain. Additionally, the knowledge graph 205 includes passage edges 212, 214, 222, 224, 226, 228, 232, 234, 236, and 238 represented as edges between the nodes. The passage edge represents a passage from the texts where the connecting entity nodes co-occur.

Figure 2B:
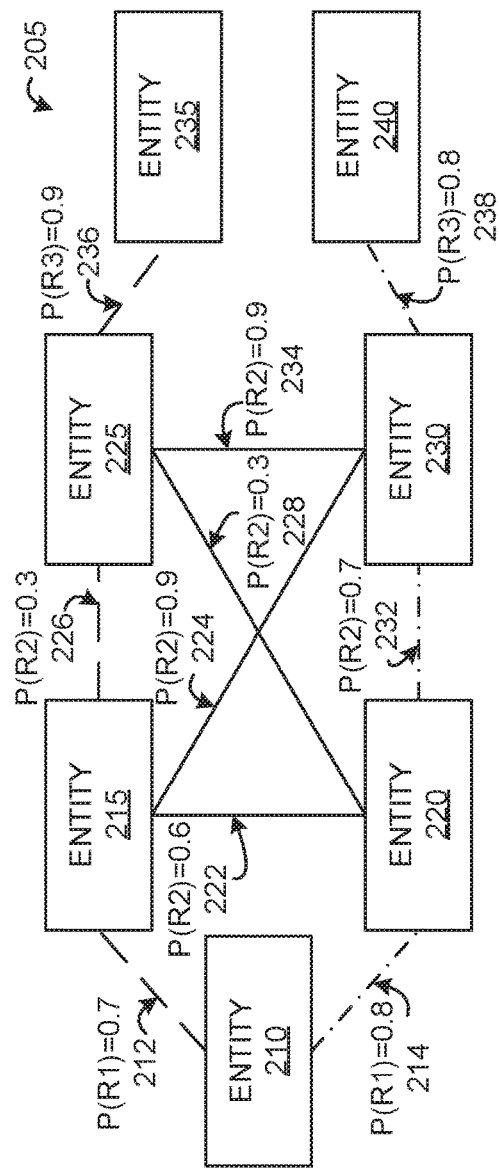

FIG. 2B is an entity graph generated by the neuro-symbolic rules system with learned neuro-symbolic rules applied to every edge, in accordance with embodiments of the present disclosure. The entity graph 205 includes entity nodes 210, 215, 220, 220, 225, 230, 235, and 240. Each entity node is an entity extracted from the texts that are relevant to a predetermined domain. Each passage from passage edges 212, 214, 222, 224, 226, 228, 232, 234, 236, and 238 are applied learned neuro-symbolic rules and are given a relation and a probability. The probability for each applied rule relates to a confidence value the neuro-symbolic rules system 100 has between the corresponding entity nodes and the provided rule.

Entity node 210 is connected to entity node 215 by edge 212, where edge 212 refers to a passage given a relation R1. The probability the neuro-symbolic rules system 100 has given this relation is 0.7. Entity node 210 is also connected to entity node 220 by passage edge 214 given relation R1 with a probability of this relation being 0.8. Entity node 215 is connected to entity node 225 by passage edge 226 with applied relation R2 having a probability of 0.3. Entity node 215 is also connected to entity node 220 by passage edge 222 with applied relation R2 having a probability of 0.6. Entity node 215 is also connected to entity node 230 by passage edge 224 with applied relation R2 having a probability of 0.9. Entity node 225 is connected to entity node 220 by passage edge 228 with applied relation R2 having a probability of 0.3. Entity node 225 is also connected to entity node 230 by passage node 234 with applied relation R2 having a probability of 0.9. Entity node 225 is also connected to entity node 235 by passage edge 236 with applied relation R3 having a probability of 0.9. Entity node 230 is connected to entity node 240 by passage node 238 with applied relation R3 having a probability of 0.8

Using symbolic rules, multi-hop reasoning is performed on the entity graph 205. The multi-hop reasoning is illustrated by the dashed passage edges 212, 226, and 236, as well as the dashed and dotted passage edges 214, 232, and 238. The dashed passage edges and the dashed and dotted passage edges represent multi-hop reasoning that produces a reasoning path from a head entity to a potential answer, respectively. Given a symbolic rule that defines an interaction between entity node 210 and entity node 240 using a conjunction of relations R1, R2, and R3, then the neuro-symbolic rules system 100 traverses that path. By locating such a path in the entity graph, it can be said that entity node 210 and entity node 240 have proof, or evidence, of a target relation.

Likewise, given another path, the symbolic rule defines an interaction between entity node 210 and entity node 235 that uses the conjunction of R1, R2, and R3. The neuro-symbolic rules system 100 also traverses the path as a potential answer candidate.

For each potential path, there is a probability associated with each passage edge. In some embodiments, a Grady search is performed. A Grady search selects the edges with the highest probability to determine the potential path with the correct answer. In some embodiments, a beam search is performed. A beam search is a heuristic search algorithm that explores a graph by expanding the most promising node in a limited set. Starting with entity node 210, using a beam search, each option is analyzed using a search tree to find a global optimum of the potential paths. The potential path with the global optimum can be selected as the answer to a query question given to the neuro-symbolic rules system 100.

In some embodiments, each potential path is given a structured prediction based on the combination of relations between the entity nodes. For example, a potential path for interaction between entity node 210 and entity node 235 may exist using relations R1, R2, R2, and R3. Plotted onto entity graph 205, the potential path can be represented by passage edges 212, 224, 234, and 236. If an analysis of the path is performed using the probabilities of each relation on the passage edges, then that potential path may appear as a likely answer. However, there may exist a symbolic rule that defines a relation between entity nodes using R1, R2, R2, and R3 as an unlikely combination, then the neuro-symbolic rules system 100 can give that potential path an overall score lower than other potential paths.

Figure 3:
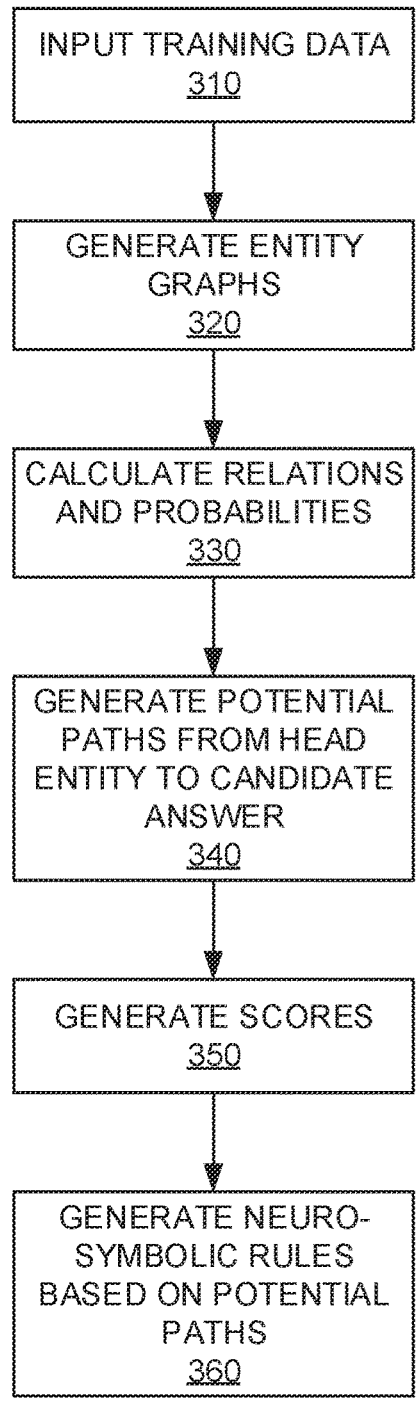
FIG. 3 is a flow diagram of a neuro-symbolic rules learning using multi-hop reasoning process, in accordance with embodiments of the present disclosure.

FIG. 3 is a flow diagram illustrating a process 300 of learning neuro-symbolic rules to perform multi-hop reasoning, in accordance with embodiments of the present disclosure. The process 300 begins by inputting training data into a neural model 140. This is illustrated at step 310. The training data 110 includes a query with a head entity and a target relationship. The query seeks to determine an answer that corresponds to an answer entity having a target relationship to the head entity. For example, the head entity may be a drug, and the target relationship may be a particular drug-drug-interaction. A drug-drug interaction is a change in a drug's effect on the body when the drug is taken together with a second drug. As such, an answer entity would be another drug that meets that criteria. In some embodiments, multiple queries are inputted into the neural model 140. For example, in question answering and natural language inference training, multiple queries can be used to train the neural model 140.

In addition to the query, the input data 110 includes texts (e.g., documents, papers, websites) pertaining to a particular domain. For example, the texts may be a list of textual paragraphs containing information pertaining to pharmaceuticals. The texts can include passages containing possible entities and their relations with each other as they relate to the pharmaceutical field.

In some embodiments, the training data includes a list of pre-defined relationships between the pre-defined entities. For example, the training may include a knowledge base relating to the domain. A knowledge base, as referred herein, is a collection of entity-relation tuples as they relate to a particular domain.

The training data also includes a list of pre-defined entities. The list includes potential entities for which the entity graph generator 130 can use to generate the entity graph from the texts. The list of pre-defined entities can assist in determining relevant entities without requiring the need to tag the entities directly from the texts.

The entity graph generator 130 generates an entity graph based on the entities extracted by the entity extractor 120. This is illustrated at step 320. The entity graph represents the pre-defined entities extracted as nodes and passages from the texts represented as edges. The passages selected as edges contain the co-occurrence of the corresponding connecting nodes appearing in a particular passage. For example, if a first entity and a second entity appear together in a passage, then the entity graph would represent the first entity as a node connected to the second entity with an edge representing that particular passage.

The neural model 140 determines textual relations between entities connected by edges in the entity graph. This is illustrated at step 330. Each passage that represents an edge in the entity graph is inputted into neural model 140, which determines a textual relation between the two entities. For example, the neural model 140 can examine a passage edge connecting a first entity and a second entity. Based on the passage, the neural model 140 can induce a textual relation between the first entity and the second entity. Additionally, the neural model 140 provides a probability of that textual relation based on the passage. The neural model 140 can use an RNN to directly represent the essential linguistic structure, such as word sequences and constituent/dependency trees. In some embodiments, the neural model 140 uses an LSTM based RNN to determine the relation between the entities. THE LSTM-RNN can use sequential labelings, such as clause identification, phonetic labeling, and NER. Additionally, a conditional random field layer can be placed on top of the LSTM-RNN to perform part-of-speech tagging and chunking. In addition to the textual relation, the neural model 140 produces a probability of the textual relation, where the probability reflects a confidence value, the neural model 140 has relating to the textual relation.

In some embodiments, the textual relation is converted into a symbolic relation that can be used in knowledge base completion as well as further training the neural model 140 in learning neuro-symbolic rules.

In some embodiments, the neural model 140 uses a bidirectional sequential RNN and a bidirectional tree-structured RNN to model entities and relations in a single model. The relations can be extracted from the extracted entities using a single incrementally-decoded NN structure, and the NN parameters are jointly updated using both entity and relation labels. The model can include an embedding layer, a word sequence LSTM-RNN layer, and a sub-tree LSTM-RNN layer.

Reasoning paths are determined between the answers from the training data and the head entity indicated by the query. This is illustrated at step 340. Using multi-hop reasoning, the entity graph can be analyzed to determine the reasoning paths. Multi-hop reasoning allows for inferences to be made from multiple passages which is akin to examining intermediate edges between a head entity and an answer. The potential reason paths can be considered as proof, or evidence, that the two entities have a target relation. Multi-hop reasoning rules can be induced based on the reasoning paths produced, and whether those rules indicate a correct answer or an incorrect answer. Each edge can be given a symbolic relation, and each edge along the reasoning path can be combined together to assemble a multi-hop reasoning rule.

The neural model 140 scores the reasoning paths. This is illustrated at step 350. In some embodiments, the neural model 140 performs a beam search from the head entity to the target entity to score the potential reasoning paths with a global optimum score. The beam search analyzes the initial edge probability but also other edge probabilities to determine the most optimal route. In some embodiments, each potential reasoning path is provided with a structured prediction score. If a corresponding neuro-symbolic rule exists indicating a potential path as being likely to result in a correct answer, then that potential path is given a higher score than other paths. Additionally, if a neuro-symbolic rule exists indicating a potential path is not likely to result in a correct answer, then that potential path is given a lower score than all other potential paths.

The neural model 140 generates a neuro-symbolic rule using the path with the highest score, or global optimum. This is illustrated at step 370. In some embodiments, the potential paths scored based on the probabilities assigned to each edge, as well as the structured prediction of the potential paths are used in determining the highest score. For example, if a potential path maintains a high probability for each edge and has a high global optimum, but a neuro-symbolic rule states that the potential path yields the incorrect answer, then that score will be lower than other scores of other potential paths with possibly lower probabilities. The edges along the reasoning path are converted into symbolic rules and are then combined to form a neuro-symbolic rule that reflects the relations between the head entity and the answer.

Figure 4:
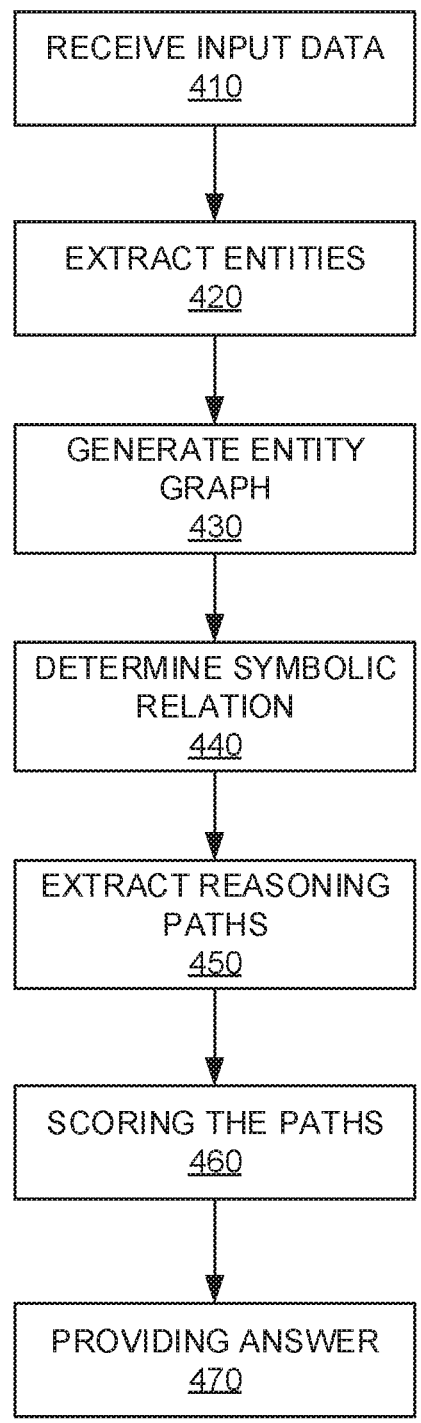
FIG. 4 is a flow diagram of a neural-symbolic rules application using multi-hop reasoning process, in accordance with embodiments of the present disclosure.

FIG. 4 is a flow diagram illustrating a process 400 of applying neuro-symbolic rules to perform multi-hop reasoning, in accordance with embodiments of the present disclosure. The process 400 begins by receiving input data 110 into a neural model 140. This is illustrated at step 410. The input data 110 includes a query with a head entity and a target relationship. The query seeks to determine an answer that corresponds to an answer entity that has the target relationship to the head entity. For example, the head entity may be a drug and the target relationship may be a drug-drug-interaction. A drug-drug interaction is a change in a drug's effect on the body when the drug is taken together with a second drug. As such, an answer entity would be another drug that meets that criteria.

In addition to the query, the input data 110 includes texts pertaining to a particular domain. For example, the texts may be a list of textual paragraphs that contain information pertaining to pharmaceuticals. The texts can include passages containing possible entities and their relations with each other as they relate to the pharmaceutical field.

The entity extractor 120 extracts entities from the texts relating to a domain. This is illustrated at step 420. In texts, entities and their relations are given by a span of words. Because of the variety of natural language, the same entity/relation may be described in several different forms. As such, the entity extractor 120 can scan the texts and identify the various variations an entity may possess in order to extract all possibilities of that entity. The entity extractor 120 is an entity tagging mechanism capable of traversing the texts to identify the entities within the texts.

In some embodiments, the entity extractor 120 extracts entities using a multi-turn question answering task. Each entity is characterized as a question answering template, and the entities are extracted by answering the question template. The questions can be posed sequentially, and each question must be answered correctly in order for the entity to be extracted. By doing so, hierarchical dependencies are also captured.

In some embodiments, the entity extractor 120 extracts words using a Begin, Inside, Last, Outside, Unit (BILOU) encoding scheme. Each entity in the texts receives an entity tag representing an entity type and the position of a word within the entity. For example, an entity John Doe would be assigned entity tags B-PER and L-PER, which denote the beginning and last words of a person entity type, respectively.

In some embodiments, the input data includes a list of pre-defined entities. The list includes potential entities for which the entity graph generator 130 can use to generate the entity graph from the texts. The list of pre-defined entities can assist in determining relevant entities without requiring the need to tag the entities directly from the texts.

The entity graph generator 130 generates an entity graph based on the entities extracted by the entity extractor 120. This is illustrated at step 430. The entity graph represents all the entities extracted as nodes, and the passages represent the edges that contain the co-occurrence of the corresponding connected nodes.

The neural model 140 determines symbolic relations between entities connected by edges in the entity graph. This is illustrated at step 440. The symbolic relations can be determined from neuro-rules the neural model learned during training. Each passage that represents an edge in the entity graph is inputted into neural model 140, which determines a symbolic relation between the two entities. For example, the neural model 140 can examine a passage edge connecting a first entity and a second entity. Based on the passage, the neural model 140 can induce a learned symbolic relation between the first entity and the second entity. Additionally, the neural model 140 provides a probability of that symbolic relation based on the passage. The neural model 140 can use an RNN to directly represent the essential linguistic structure, such as word sequences and constituent/dependency trees. In some embodiments, the neural model 140 uses an LSTM based RNN to determine the relation between the entities. THE LSTM-RNN can use sequential labeling, such as clause identification, phonetic labeling, and NER. Additionally, a conditional random field layer can be placed on top of the LSTM-RNN to perform part-of-speech tagging and chunking.

In some embodiments, the neural model 140 uses a bidirectional sequential RNN and a bidirectional tree-structured RNN to model entities and relations in a single model. The relations can be extracted from the extracted entities using a single incrementally-decoded NN structure, and the NN parameters are jointly updated using both entity and relation labels. The model can include an embedding layer, a word sequence LSTM-RNN layer, and a sub-tree LSTM-RNN layer.

Reasoning paths are determined between answer candidates and the head entity indicated by the query. This is illustrated at step 450. Using multi-hop reasoning rules, the entity graph can analyze the entity graph to determine the reasoning paths. For example, a multi-hop reasoning rule may indicate that a target relation can be inferred from a drug-drug interaction using reasoning rules R1, R2, and R3. If the entity graph has a potential reasoning path from one drug that is the head entity to another drug entity connected by intermediate edges classified with reasoning rules R1, R2, and R3, then that path is considered a potential reasoning path. The potential reason paths can be considered as proof, or evidence, that the two entities have a target relation.

The neural model 140 scores the reasoning paths. This is illustrated at step 460. In some embodiments, the neural model 140 performs a beam search from the head entity to the target entity to score the potential reasoning paths with a global optimum score. The beam search analyzes the initial edge probability but also other edge probabilities to determine the most optimal route. In some instances, a beam search is a heuristic search algorithm that explores a graph by expanding the most promising node in a limited set. Beam search is an optimization of best-first search that reduces its memory requirements. In some embodiments, each potential path is provided with a structured prediction score. If a corresponding neuro-symbolic rule exists indicating a potential path as being likely to result in a correct answer, then that potential path is given a higher score than other paths. Additionally, if a neuro-symbolic rule exists indicating a potential path is not likely to result in a correct answer, then that potential path is given a lower score than all other potential paths.

The path with the highest score, or global optimum, is selected as the answer. This is illustrated at step 470. In some embodiments, the potential paths scored based on the probabilities assigned to each edge, as well as the structured prediction of the potential paths are used in determining the highest score. For example, if a potential path maintains a high probability for each edge and has a high global optimum, but a neuro-symbolic rule states that the potential path yields the incorrect answer, then that score will be lower than other scores of other potential paths with possibly lower probabilities.

Figure 5:
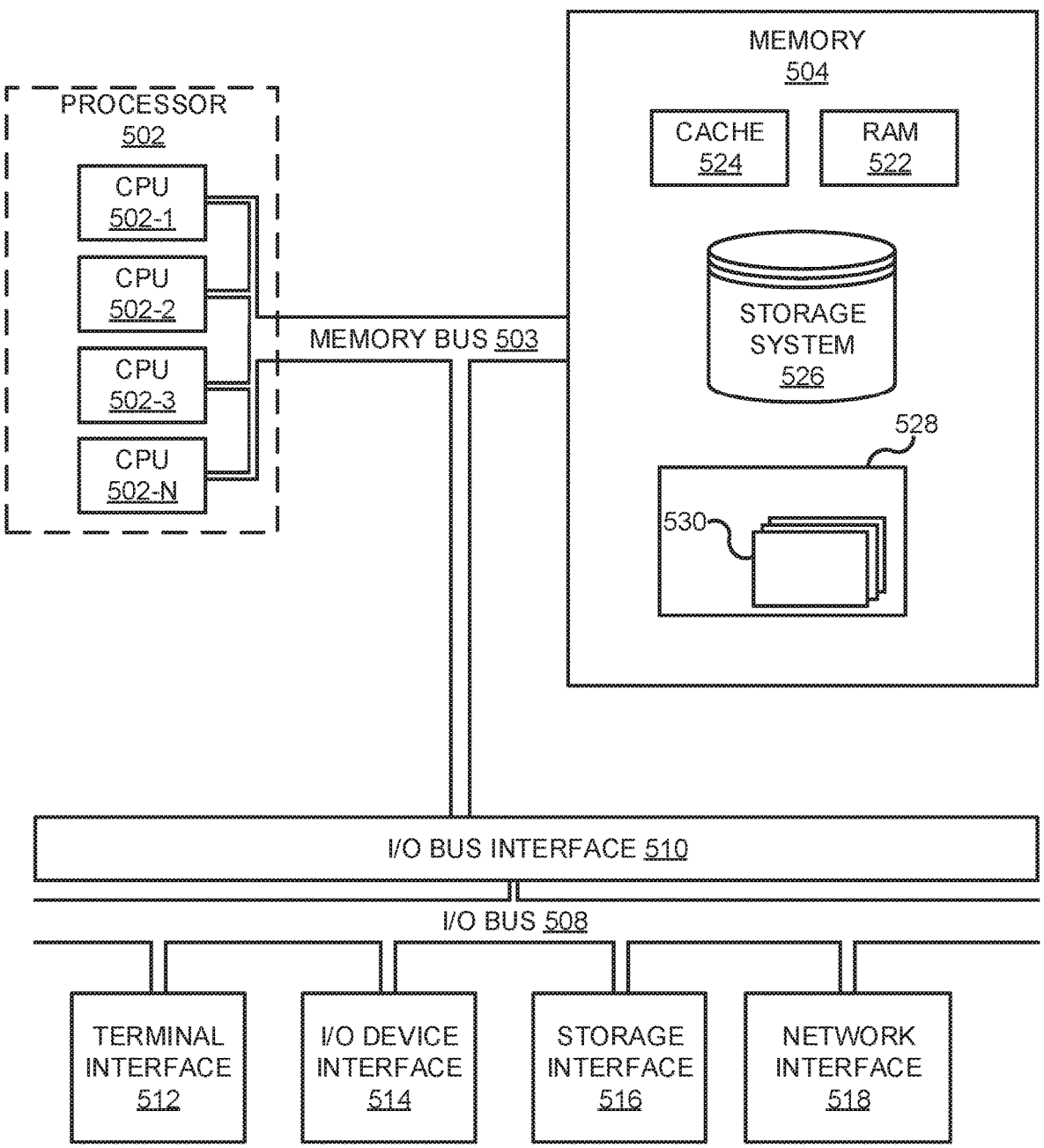
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the neuro-symbolic rules system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 501 may execute instructions stored in the memory 504 and may include one or more levels of on-board cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the neuro-symbolic rules system 100) may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
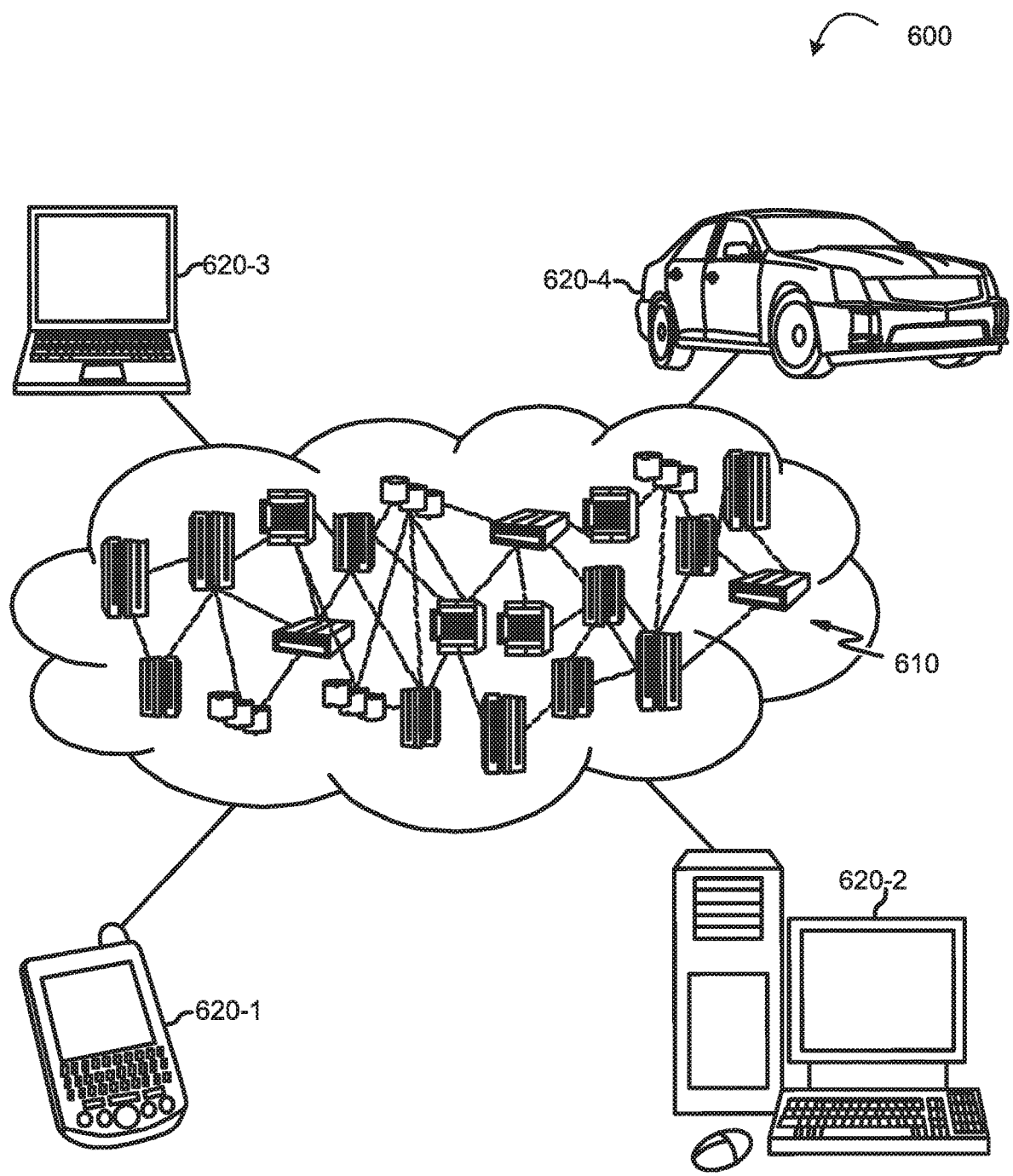
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
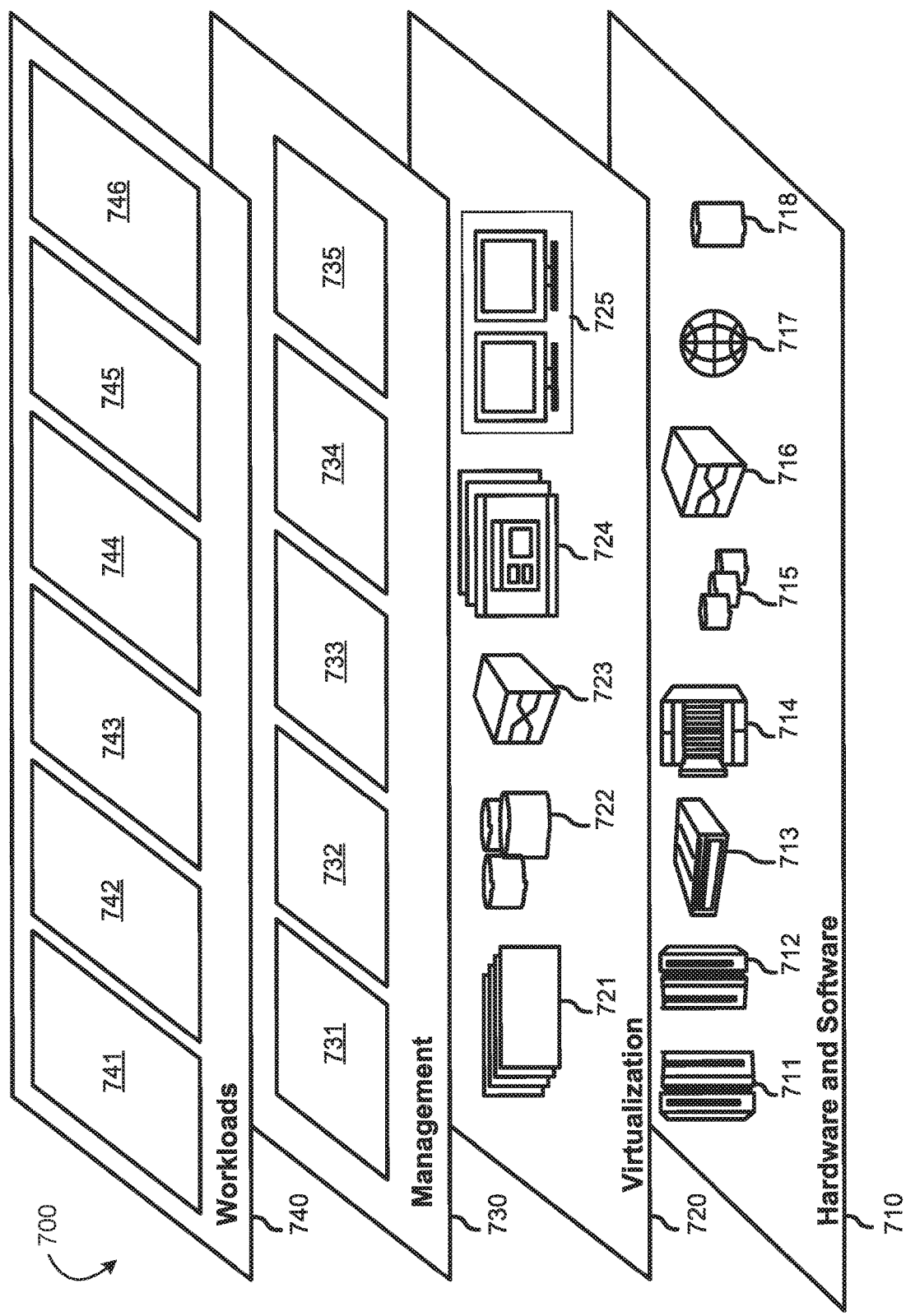
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include mapping and navigation 741; software development and lifecycle management 742 (e.g., the neuro-symbolic rules system 100); virtual classroom education delivery 743; data analytics processing 744; transaction processing 745; and precision cohort analytics 746.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for generating neuro-symbolic rules, the computer-implemented method comprising:

inputting training texts and pre-defined entities into a neural model, wherein the training texts and the pre-defined entities relate to a domain;

generating an entity graph including nodes and edges, wherein the nodes represent the pre-defined entities and the edges represent passages in the training texts with a co-occurrence of the pre-defined entities connected together by the edges;

determining a relation based on the passages for each of the pre-defined entities connected together by the edges;

calculating a probability relating to the relation for each of the pre-defined entities;

generating a potential reasoning path between a head entity and a target entity;

scoring the potential reasoning path based on a beam search of the potential reasoning path using the-probabilities of the edges;

learning a neuro-symbolic rule by converting the edges along the potential reasoning path into symbolic rules and combining the symbolic rules into the neuro-symbolic rule; and applying the neuro-symbolic rule to perform multi-hop reasoning, thereby increasing a possibility that an entity answer selected using the multi-hop reasoning is correct.

2. The computer-implemented method of claim 1, further comprising:
inputting answers into the neural model; and
scoring the potential reasoning path based on the answers.

3. The computer-implemented method of claim 1, further comprising:
providing answer candidates to the neural model; and
learning neuro-symbolic rules for the answer candidates.

4. The computer-implemented method of claim 1, further comprising:
inputting pre-defined symbolic rules into the neural model; and
combining the pre-defined symbolic rules with the neuro-symbolic rule.

5. The computer-implemented method of claim 1, wherein the neural model is a long short-term memory (LSTM) recurrent neural network (RNN).

6. The computer-implemented method of claim 1, wherein the neural model includes entity-aware encoding.

7. A computer-implemented method for applying neuro-symbolic rules, the computer-implemented method comprising:
inputting texts comprising passages pertaining to a domain into a neural model;
inputting a query relating to the domain, wherein the query includes a head entity and a target relationship into the neural model;
extracting entities from the texts, wherein the entities relate to the domain;
generating an entity graph with nodes connected by edges, wherein the nodes represent the entities extracted from the text and the edges represent passages within the texts with a co-occurrence of the entities connected together by the edges;
determining a textual relation for each of the edges in the entity graph including a probability relating to the textual relation;
extracting potential reasoning paths for candidate answers in the entity graph by applying the neuro-symbolic rules learned by the neural model, wherein applying the neuro-symbolic rules increases a possibility that the entity answer is correct;
scoring the potential reasoning paths based on a structured prediction; and
providing an entity answer based on scoring the potential reasoning paths.

8. The computer-implemented method of claim 7, further comprising:
weighing the symbolic relation for each of the edges within the potential reasoning paths.

9. The computer-implemented method of claim 7, further comprising:
converting a reasoning path with a highest score into a neuro-symbolic rule; and
combining the neuro-symbolic rule with the neuro-symbolic rules already learned by the neural model.

10. The computer-implemented method of claim 7, wherein the entities are pre-defined entities relating to the texts.

11. The computer-implemented method of claim 7, wherein scoring the potential reasoning paths is performed by a beam search through the entity graph to the candidate answer.

12. The computer-implemented method of claim 7, further comprising:
optimizing the potential reasoning paths based on the structured prediction, wherein a potential reasoning path that has a neuro-symbolic rule indicating a likely correct answer is assigned a higher score as compared to scores of other potential reasoning paths, and
a potential reasoning path that has a neuro-symbolic rule indicating a likely incorrect answer is assigned a lower score as compared to scores of other potential reasoning paths.

13. The computer-implemented method of claim 7, wherein the query includes multiple queries inputted into the neural model.

14. A neuro-symbolic rules system for learning neuro-symbolic rules using multi-hop reasoning, the neuro-symbolic rules system comprising:
one or more computer-readable storage media storing program instructions and one or more processors which, in response to executing the program instructions, are configured to:
extract entities from texts for a domain, wherein the entities are nouns relating to the domain;
generate an entity graph including nodes and edges, wherein the nodes correspond to the entities and the edges correspond to passages within the texts with a co-occurrence of the entities connected together by the edges;
determine, using a neural model, reasoning paths between a head entity and an answer entity that result in a target relationship, wherein the neural model scores the reasoning paths based on probabilities calculated by the neural model for each edge along the reasoning path;
learn, by the neural model, a neuro-symbolic rule; and
apply the neuro-symbolic rule to the reasoning paths, for increasing a possibility increases a likelihood of selecting a correct entity.

15. The neuro-symbolic rules system of claim 14, wherein the neural model scores the reasoning paths based on inputted ground truth answers during a training process.

16. The neuro-symbolic rules system of claim 14, wherein the neural model is a long short-term memory recurrent neural network.

17. The neuro-symbolic rules system of claim 14, wherein the neural model scores the reasoning paths based on a beam search and using structured prediction.

18. The neuro-symbolic rules system of claim 14, wherein the neuro-symbolic rule is learned by converting the edges along the reasoning paths into symbolic rules and combining those rules into the neuro-symbolic rule.

19. The neuro-symbolic rules system of claim 18, wherein the neuro-symbolic rule is added to other neuro-symbolic rules learned by the neural model.

20. The neuro-symbolic rules system of claim 18, wherein the neural model is configured to determine weights for the symbolic rules.

* * * * *